US012342365B2

United States Patent
Xu et al.

(10) Patent No.: US 12,342,365 B2
(45) Date of Patent: Jun. 24, 2025

(54) MULTIPATH-SCHEDULING-BASED RELAY DEVICE

(71) Applicant: PEKING UNIVERSITY, Beijing (CN)

(72) Inventors: Chenren Xu, Beijing (CN); Yunzhe Ni, Beijing (CN); Feng Qian, Shanghai (CN)

(73) Assignee: Peking University, Beijing (CN)

( * ) Notice: Subject to any disclaimer, the term of this patent is extended or adjusted under 35 U.S.C. 154(b) by 535 days.

(21) Appl. No.: 17/754,925

(22) PCT Filed: Oct. 23, 2020

(86) PCT No.: PCT/CN2020/123085
§ 371 (c)(1),
(2) Date: Apr. 15, 2022

(87) PCT Pub. No.: WO2021/078232
PCT Pub. Date: Apr. 29, 2021

(65) Prior Publication Data
US 2023/0276483 A1    Aug. 31, 2023

(30) Foreign Application Priority Data
Oct. 24, 2019   (CN) .......................... 201911015828.3

(51) Int. Cl.
*H04W 72/56*    (2023.01)
*H04W 72/542*   (2023.01)
*H04W 72/543*   (2023.01)

(52) U.S. Cl.
CPC ....... *H04W 72/542* (2023.01); *H04W 72/543* (2023.01); *H04W 72/56* (2023.01)

(58) Field of Classification Search
None
See application file for complete search history.

(56) References Cited

U.S. PATENT DOCUMENTS 7,583,677 B1 *   9/2009   Ma .................. H04L 45/243
                                                    370/235
2009/0225758 A1 * 9/2009 Morimoto ......... H04L 69/165
                                                    370/395.1
(Continued)

FOREIGN PATENT DOCUMENTS

CN    105262696 A    1/2016
CN    105553872 A    5/2016
(Continued)

OTHER PUBLICATIONS

International Search Report. PCT/CN2020/123085, mailed Jan. 26, 2021.
Official Communication of CN201911015828.3, mailed Jun. 2, 2020.

*Primary Examiner* — Jenkey Van
(74) *Attorney, Agent, or Firm* — Michael Ye; Kalos Athena Wang PLLC

(57) ABSTRACT

The present invention relates to a relay device based on multi-path scheduling, at least comprising: at least one communication-receiving module, at least one hardware interface module, and at least one data-processing module, wherein the data-processing module, according to a specific type of target data, distributes the user data received through the communication-receiving module to a first processing path that processes the data in a predetermined manner and a second processing path that is independent of the first processing path and bypasses a kernel protocol stack. The data-processing module employs a multi-stage continuous scheduling manner to drive the user data in the second processing path to be transmitted in at least two mutually independent communication paths, thereby realizing multi-path transmission between the plural clients and the plural servers. This configuration not only lifts the logic of packet scheduling to the application layer, but also ensures path (Continued)

quality, QoE, and fairness while maintaining the multi-connection, multi-path, application-independent nature.

6 Claims, 2 Drawing Sheets

(56) References Cited

U.S. PATENT DOCUMENTS

2013/0194923 A1    8/2013  Basso et al.
2016/0227551 A1*  8/2016  Freeman ............. H04W 72/542
2022/0393970 A1* 12/2022  Amend ................... H04L 47/24

FOREIGN PATENT DOCUMENTS

| | | | |
|---|---|---|---|
| CN | 106559840 A | | 4/2017 |
| CN | 110650089 A | | 1/2020 |
| CN | 110730470 A | | 1/2020 |
| KR | 20040049732 A | * | 6/2004 |

* cited by examiner

MULTIPATH-SCHEDULING-BASED RELAY DEVICE

BACKGROUND OF THE INVENTION

1. Technical Field

The present invention relates to the technical field of mobile communication, and more particularly to a relay device based on multi-path scheduling.

2. Description of Related Art

With the rapid development of wireless network technologies, extensive deployment of diverse network equipment, and popularization of multi-network interface mobile terminals, parallel data transmission based on fusion of various radio access technologies (RATs) have become a research hotspot in the field of communication. The continuously emerging wireless communication systems provide users with a heterogeneous network environment. Popular heterogeneous networks include wireless personal area networks (WPANs), such as Bluetooth and Zigbee; wireless local area networks (WLANs), such as Wi-Fi and WiGig; wireless metropolitan area networks (WMANs), such as WiMAX; mobile communication networks, such as 3G, 4G, and 5G; satellite networks; mobile ad hoc networks; and wireless sensing networks. Meanwhile, the existing communication terminals usually have multiple network interfaces. For example, a laptop computer can be equipped with a wired network interface and a wireless Wi-Fi network adapter, while a smartphone can access both cellular networks (such as UMTS, 3G, 4G, 5G, etc.), and Wi-Fi networks. Besides, network operators usually prepare spare links and equipment for their access links and backhaul links, so as to ensure connectivity in the event of network failure. This causes plural paths to co-exist between two communication ends. In such a background, naturally, people would want to use these paths in parallel to enhance robustness and transmission performance of end-to-end connection. The resulting multi-path connection facilitates load balancing and dynamic switching as it can automatically shift service from the link that is most congested and tends to break to a relatively solid path.

Currently, based on the various radio access technologies implemented by cellular systems, multi-layer overlapping, as well as close assembly and collaboration among multiple links, users can enjoy enriched and optimized services. Therein, the researches into heterogeneous network convergence are mainly directed to the following topics: a) reasonable selection and service switching among multi-standard networks through interoperation of multiple access technologies; b) establishment of flexible and reliable networks through diverse connection approaches, thereby saving time, system overheads, and energy consumption; and c) unified self-organization and self-optimization of multi-standard, multi-layer, multi-connection, complex networks, thereby reducing capital output and operating costs. Nevertheless, the conventional transmission control protocol (TCP) only supports single-path transmission of data. To overcome the unfavorable situation, in 2011, the Internet Engineering Task Force (IETF) published a multi-path transmission control protocol (MPTCP) compatible with both TCP and the current applications, which allows mobile terminal devices to perform multi-path data transmission using heterogeneous wireless network technologies with maximized network throughput and minimized transmission delay.

For example, International Patent Publication No. WO2016144224A1 discloses methods and arrangements for multi-path traffic aggregation using a multi-path transmission control protocol (MPTCP) proxy, configured with a unique Internet Protocol (IP) address. The prior-art methods involve performing data relay between a wireless device having MPTCP ability and a server in the MPTCP proxy, and particularly comprise: establishing an MPTCP session between the MPTCP proxy and the wireless device, the MPTCP session comprising a first MPTCP subflow mapped on a first network path for the wireless device using a default traffic flow tuple, and establishing a TCP session with the server. The method further comprises initiating a further MPTCP subflow in the MPTCP session between the MPTCP proxy and the wireless device, based on a mapping of the further MPTCP subflow to a second network path for the wireless device using a filtering traffic flow tuple comprising the unique IP-address configured for the MPTCP proxy. Data is relayed between the wireless device and the server, wherein data between the MPTCP proxy and the wireless device is exchanged in the MPTCP session comprising the first MPTCP subflow on the first network path and the further MPTCP subflow on the second network path, and wherein data between the MPTCP proxy and the server is exchanged in the TCP session. The prior-art patent solves the technical issue as described below. MPTCP depends on kernel reconstruction, and requires both the client and the server to support MPTCP. Therefore, it is unlikely that every host in a network supports MPTCP. In order to enable two MPTCP-incapable communication hosts to implement MPTCP-based multi-path transmission, the prior-art patent deploys a MPTCP proxy at the packet data network gateway (PGW), which converts the standard TCP protocol of the server to the MPTCP protocol of the transmission-oriented user equipment (UE). However, the method and arrangement of prior-art patent do not really make two MPTCP-incapable communication hosts enjoy the benefits of MPTCP. Specifically, the method of the prior-art patent provides merely data relay between a MPTCP-supporting wireless device and a server. Therein, an MPTCP proxy is provided between the MPTCP-supporting wireless device and the server, and multi-path transmission is realized between the MPTCP-supporting wireless device and the MPTCP proxy, while the MPTCP proxy and the server have normal single-path TCP connection. This requires at least one of the communicating hosts to support the MPTCP protocol, so that the other communication host not supporting MPTCP can then work with the additionally installed MPTCP proxy. Thus, in essence, the prior-art patent is not a solution for two communication hosts that both do not support the MPTCP protocol to implement multi-path transmission.

For example, China Patent Publication No. CN108075987A discloses a multi-path data transmission method and a device thereof, wherein at least two multi-path data sub-streams are established between multi-path proxy client and multi-path proxy gateway based on a first Internet Protocol (IP) address, and data transmission can be achieved through the multi-path data sub-streams. Between the multi-path proxy gateway and application server to be visited by the multi-path proxy client, according to the first IP address used to establish the at least two multi-path data between multi-path proxy client and multi-path proxy gateway, TCP links are established and TCP data transmission are realized.

Due to the proxy connection between the multi-path proxy client and the multi-path proxy gateway, MPTCP multi-path data transmission can be achieved on basis of the IP address information of multi-path proxy client. The prior-art patent only establishes MPTCP-based multi-path transmission connection between a multi-path proxy client and a multi-path proxy gateway, and leaves data between the multi-path proxy gateway and a server to the TCP-based transmission. However, the proxy gateway or the proxy client has to supports the MPTCP protocol at its kernel, and this makes software programming difficult. While the prior-art patent is effective in preventing security vulnerability that otherwise happens when the IP address of the proxy server is visible at both the user side the network side and enabling statistics and control of terminal traffic by making the IP address of the terminal acquirable, it has a significant defect. That is, since MPTCP exists in the kernel, it requires considerable clock overheads to send network health data to the kernel, which not only causes performance loss, but also leave an attackable node in the kernel and make the system software vulnerable.

For example, China Patent Publication No. CN107979833A discloses a polymorphism information fusion intelligent terminal based on heterogeneous network internetworking and intercommunication, including scheduling system and hardware device. The scheduling system includes service creation system, signal management system and signal access system. The hardware device includes: PDT communication modules slot, LET communication modules slot, BeiDou system communication chip slot, self-organized network communication module slot, short-wave satellite communication module slot, volume control button, network selection key, screen start button, touch control screen and built-in antenna. The communication equipment of the prior-art patent uses a scheduling system to select the currently optimal communicable network from currently available networks in a unified scheduling, self-adaptive manner. However, the scheduling method in the prior-art patent simply makes determination for priority scheduling according to signal strength in standard networks, without paying consideration to round-trip time (RTT) and bandwidth (BW) of these alternative networks. However, in fact, in the scene of dynamic mobility, signal strength and network performance are less relevant to each other than the prior-art patent expects. Hence, the approach to scheduling data streams to standard network according to signal strength is probably unreliable.

Therefore, in addition to the issues concerning large-scale deployment and security caused by incompatibility between multi-path transmission device and traditional middleware, also important is how to make full use of network resources of multi-path transmission by dynamically distributing and converging services over networks based on different access technologies so as to provide users with reliable, efficient, convenient network services, such as quality of connection, quality of experience (QoE) and quality of service (QoS). While multi-path parallel transmission helps increase throughput, performance differences among different transmission paths (in terms of RTT and packet loss rate) can lead to out-of-order delivery of data packet at the receiving end, which may be responsible for blocked cache and degraded overall throughput. Additionally, since packet loss is unavoidable during transmission, improper selection of paths for retransmission of lost data is also a major cause of blocked cache at the receiving end.

A part of the prior art is also reflected in Literature [1] (Zhou Dongmei. Research of Ubiquitous-Network-Based Multipath Parallel Transmission Mechanism [D]. University of Electronic Science and Technology of China, 2014). This paper discloses a packet scheduling scheme for multi-path transmission based on the cache overflow probability at the receiving end, which effectively reduces data packet out-of-order delivery as seen at the receiving end, and rescuing cache occupancy at the receiving end. The known scheme solves the problem of the existing packet distributing strategy that only considers the average time delay of transmission paths but ignores the randomized time-varying nature of time delay. In dynamically varying time delay of paths, packets may arrive at the receiving end in a disarranged order and cause cache overflow.

For example, China Patent Publication No. CN107682258A discloses a virtualization-based multi-path network transmission method and a device thereof, wherein the method includes: having a control node obtain the network state of data transmission network in a real-time manner, and acquire the topological structure of data transmission network; when first target data are transmitted through the data transmission network, according to the topological structure and network state of the data transmission network, using a preset routing algorithm to determine the path information of the first target data; having the control node send the path information to source node, so that the source node can, according to path information, split first target data into plural pieces of second target data, which will be sent to destination node through multiple paths and, after being received by the destination node, further reverted into first target data, so as to realize the multi-path transmission of first target data, without the use of complicated cross-layer cooperation mechanism, thereby reducing the complexity of control and scheduling process.

Another example can be seen in Literature [2] (Wang Ran, Xie Dongliang. Multipath Scheduling Algorithm Optimization Based on Estimated Delivery Time [J]. 2016). This paper discloses a multi-path scheduling algorithm optimization based on estimated delivery time, which, on the basis of the combination of network coding and multi-path transmission protocols, performs exponential smoothing forecast according to RTT and the packet loss rate in the path of acknowledgements (ACKs), and provides relatively precise estimates when codes in individual paths arrive, so that the code blocks can be decoded successively.

However, all of these known multi-path scheduling methods and device fail to consider that optimization of mobile communication equipment should be made to improve aggregative user QoE but not QoE from perspective of any single user, so the consideration has remained unpaid. Particularly, there is a need for a multi-path scheduling solution seeking for aggregative user QoE in a multi-path transmission framework that is compatible with the existing middleware and independent of applications.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

In view of the shortcomings of the prior art, the present invention provides a relay device based on multi-path scheduling, for being deployed in a routing path for communication between a plurality of clients and a plurality of servers so as to converge a plurality of radio access networks, the relay device at least comprising: at least one communication-receiving module, for receiving user data of the plural clients; at least one hardware interface module, for accessing a network that provides at least two mutually independent communication paths, so as to distribute the user data through the at least two communication paths; and at least one data-processing module, for mapping the received user data to a respective interface of each of the at least two mutually independent communication paths. The data-processing module, according to a specific type of target data, distributes the user data received through the communication-receiving module to a first processing path that processes the data in a predetermined manner and a second processing path that is independent of the first processing path and bypasses a kernel protocol stack. The configuration of the present invention does not require kernel modification and is compatible with the existing network middleware deployed in a large scale, thereby constructing a multi-path transmission framework at the user space level. The data-processing module can work in a separate network namespace, so as not to conflict with kernel configurations of other programs.

According to a preferred embodiment, the first processing path sends the data to a user space or the kernel protocol stack, and the second processing path directly transmits the target data of the specific type to a user space on the data-processing module while bypassing the kernel protocol stack.

According to a preferred embodiment, the data-processing module inversely multiplexes the data in the second processing path to a plurality of interfaces, wherein inversely multiplexing refers to segmenting and packaging data streams into messages, and distributing the messages to the plural communication paths.

The present invention further provides a relay device based on multi-path scheduling, at least comprising a data-processing module. The data-processing module is configured to transmit, in a multi-stage continuous scheduling manner, data sent by at least one client/server, the multi-stage continuous scheduling including: a first stage where an order of connections of the plural clients/servers is determined; a second stage where priority-based transmission is performed; and a third stage where the data streams having the order of connections determined in the first and second stages are mapped to at least one said communication path. The data-processing module employs to, in a multi-stage continuous scheduling manner, drive the user data in the second processing path to be transmitted in at least two mutually independent communication paths accessed by at least one hardware interface module, thereby realizing multi-path transmission between the plural clients and the plural servers. This configuration not only lifts the logic of packet scheduling to the application layer, but also ensures path quality, QoE, and fairness while maintaining the multi-connection, multi-path, application-independent nature.

According to a preferred embodiment, the data-processing module is configured to implement the scheduling in the first stage through: classifying the user data in the second processing path or the data transmitted by the clients/servers into control streams that are always scheduled preferentially and are used to internally control information delivery, and user streams that correspond to individual said clients/servers; and according to a user-designated grading policy, splitting the plural user streams into at least two first packets having different first priority levels, and scheduling the connections with respect to the clients/servers in the at least two first packets according to a descending order of the first priority levels.

According to a preferred embodiment, the connections with respect to the clients/servers in the first packets are assigned with second priority levels by means of completely fair scheduler, and the individual connections with respect to the clients/servers in the first packets are scheduled according to a descending order of the second priority levels.

According to a preferred embodiment, when a new user stream joins the plural connections with respect to the clients/servers in the first packets during the scheduling in the first stage, the data-processing module assigns the new user stream with the highest second priority level, and implements scheduling in a circular manner. Scheduling in the circular manner refers to when the new user stream has a transmission time exceeding a first time threshold, or when the new user stream has a data volume exceeding a first data threshold, decreasing the second priority level of the new user stream to the lowest second priority level, and then dynamically increasing the second priority level of the user stream by means of completely fair scheduler until it reaches the highest second priority level.

According to a preferred embodiment, the data-processing module is configured to implement the scheduling in the third stage through: according to the order of the connections with respect to the plural clients/servers determined in the first and second stages, sequentially mapping the user streams corresponding to the clients/servers to at least one said interface. Based on a second data threshold, the user streams of the individual clients/servers are classified into first data streams below the second data threshold and second data streams above the second data threshold. The first data streams are bound to one of the plural interfaces, and the second data streams are mapped to the remaining interfaces.

According to a preferred embodiment, the data-processing module is configured to map the second data streams to the remaining interfaces through: unifying first scheduling behavior about multi-path transmission based on the remaining interfaces and second scheduling behavior about cross-path retransmission, and assigning the optimal interface to each data packet in the second data streams so as to provide the best quality of service.

According to a preferred embodiment, the data-processing module is configured to implement the scheduling in the second stage through: in response to the second scheduling behavior about the data packets to be retransmitted in the third stage, preferentially transmitting the data packets to be retransmitted. Each of the data packets to be retransmitted is mapped to an available said interface other than the interface previously used for initial transmission of the data packet, so as to achieve cross-path retransmission.

According to a preferred embodiment, when one said client opens plural connections to connect resources in the same server in the first stage, the data-processing module packets the plural connections with respect to the client directed to the resources in the same server into a second packet. When at least one said user stream of the connection with respect to the client in the second packet terminates its session, network resources acquired by the second packet are reallocated to the remaining user streams in the second packet that have not terminated their sessions, so as to shorten transmission time of the remaining user streams, thereby balancing overheads among the servers having significant differences in data streams connected thereto.

The present invention further provides a relay device based on multi-path scheduling, at least comprising a data-processing module that is configured to perform transmission/scheduling according to a descending order of second priority levels assigned to data streams connected to individual clients/servers. When a new data stream joins connections with respect to the clients/servers, the new data stream is assigned with the highest second priority level, and the second priority level of the data stream is increased dynamically with increase of a lasting duration of the data stream.

According to a preferred embodiment, when a new data stream joins the connections with respect to the clients/servers, the data-processing module is configured to assign the new data stream with the highest second priority level, and when the new data stream has a transmission time exceeding a first time threshold or when the new data stream has a data volume exceeding a first data threshold, decrease the second priority level of the new data stream to the lowest second priority level.

According to a preferred embodiment, when the second priority level of the new data stream is decreased to the lowest or when transmission of the data stream has not been completed after a long time period, the data-processing module is configured to, by means of completely fair scheduler, increase the second priority level of the data stream whose second priority level has decreased to the lowest or increase the second priority level of the data stream whose transmission has not been completed after the long time period.

According to a preferred embodiment, when one said client opens plural connections to connect resources in the same server in the first stage, the data-processing module is configured to packet the plural connections with respect to the client directed to the resources in the same server into a second packet. When at least one said data stream of the connection with respect to the client in the second packet terminates its session, network resources acquired by the second packet are reallocated to the remaining user streams in the second packet that have not terminated their sessions.

The present invention further provides a relay method based on multi-path scheduling. The method comprises: deploying a first multi-path data-processing module and a second multi-path data-processing module in a routing path for communication between a plurality of clients and a plurality of servers. The first multi-path data-processing module communicates with the clients and converges plural access networks, and the second multi-path data-processing module communicates with the servers. The first multi-path data-processing module distributes data it receives to a first processing path and a second processing path according to an editable, specific type of data, wherein the first processing path processes the data in a predetermined manner, and the second processing path is independent of the first processing while bypassing the kernel protocol stack. In the user space, the data in the second processing path are mapped to plural communication paths that are mutually independent and a communication with the second multi-path data-processing module may be realized by means of inverse multiplexing, thereby realizing multi-path transmission between the plural clients and the plural servers.

| List of reference numbers | |
|---|---|
| 100: Client | 200: First multi-path data-processing module |
| 300: Second multi-path data-processing module | 400: Server |
| 500: Communication path | 201: Communication-receiving module |
| 202: Hardware interface module | 203: Data-processing module |
| 210: First processing path | 220: Second processing path |
| 401: Remote server | 501: Interface |

DETAILED DESCRIPTION OF THE INVENTION

Figure 1:
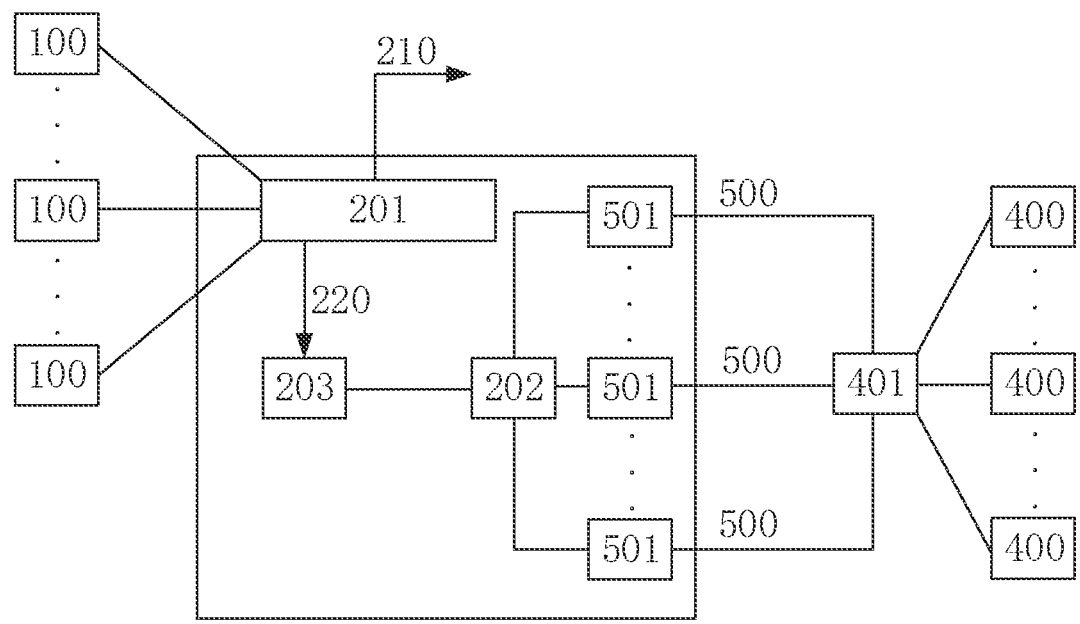
FIG. 1 is a module schematic drawing of a relay device according to one preferred mode of the present invention.
Figure 2:
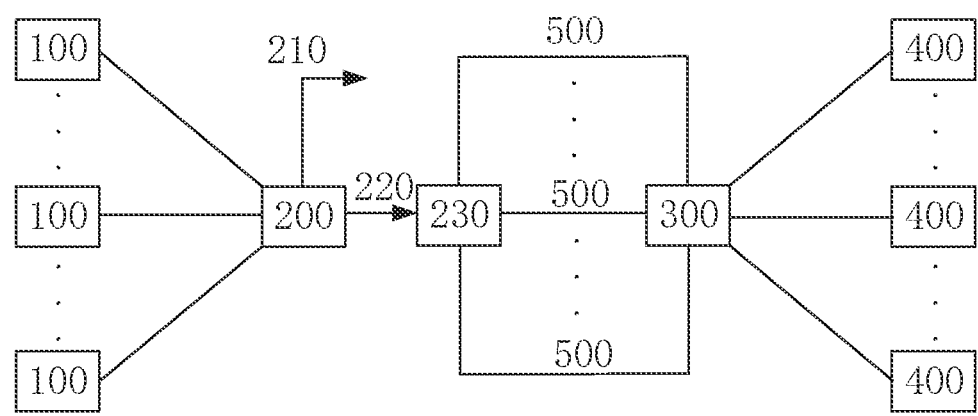
FIG. 2 is a schematic modular diagram of a method according to one preferred mode of the present invention.

The following description is to be read with reference to FIGS. 1 and 2. First, some terms used in the description of the present invention are defined.

Client: it can be various forms of user equipment (UE), or any devices with wireless communication function, such as handheld devices, vehicle-mounted devices, wearable devices, computing devices, or other processing devices connected to a wireless modem, mobile station (MS), terminal equipment, etc. It can also be application programs on the user equipment, but can also refer to an entity computer compared with a virtual machine. The client provides the virtual machine with hardware environment, thereby sometimes referred to as host or host machine.

Proxy Server: refers to a network proxy, which provides a special network service, and allows one network terminal to have no-direct connection with another network terminal through this service.

Bandwidth Aggregation: multi-path transmission is aimed at doubling the available bandwidth of a network by means of parallel transmission over plural available paths. With effective bandwidth aggregation so achieved, multihoming devices can get improved network performance.

Stream: a sequence of data that can only be read once in a pre-specified order, specifically a complete TCP/IP connection containing multiple packets.

User Stream: refers to the data stream with respect to the user.

Packet: corresponds to the network layer of TCP/IP, and refers to the data unit of communication transmission based on the TCP/IP protocol, also known as a data packet. In the context of scheduling, a packet refers to the granularity by which the scheduling strategy forwards data.

Fairness: this requires that streams undergoing multi-path transmission share the same network resources as streams of the same level in the bottleneck link. If the endpoint obtains more resources through multi-path transmission, it may cause the problem of network congestion or even collapse.

Resource Pool (RP): mostly refers to bandwidth, which changes the concept of fairness and makes it possible to implement multi-path transmission in real networks. The RP principle does not deal with each path resource independently, but treats multiple paths as a large resource pool, and then changes the scheduling of multiple path resources.

Path starvation: it means that after the path is de-congested, it cannot continue to transmit data normally.

User Space: refers to the space in which a user program operates.

Kernel Space: refers to the operation space of the kernel of an operating system.

Context: in brief an environmental parameter. Environmental parameters are parameters about network performance and for scheduling user streams, such as transmission times, bytes, etc.

Network Namespace: Linux kernel provides namespaces. A namespace packages global system resources into an abstract, and the abstract is only bound to the progress in the namespace, thereby providing isolation of resources. Network namespaces provide all the progresses in namespaces with brand new network stacks, including network interfaces, routing tables, etc.

Embodiment 1

The present embodiment discloses a relay device based on multi-path scheduling, for being deployed on a communication routing path between a plurality of clients 100 and a plurality of servers 400 for converging a plurality of radio access networks. Preferably, the radio access networks include wireless wide area network (WWAN), wireless metropolitan area network (WMAN), wireless local area network (WLAN), wireless personal area network (WPAN), mobile ad hoc network (MANET), mobile communication networks (such as 3G, 4G, 5G), satellite networks, wireless sensing networks or other heterogeneous networks with multiple access technologies and based on different operating protocols. Preferably, the mobile communication network can be any mobile communication networks of various mobile communication technologies used by different operators. Various mobile communication technologies include global system for mobile communication (GSM), wideband code division multiple access (WCDMA), code division multiple access (CDMA), time division-synchronous code division multiple access (TD-SCDMA), long term evolution (LTE) of the 3rd-generation mobile communication (3G), LTE-Advanced of the 4th-generation mobile communication (4G) standard, system architecture evolution (SAE) of 4G standard, and the 5th-generation mobile communication (5G).

Preferably, converging refers to constructing a complete, multi-user, multi-path transmission framework in a heterogeneous network environment where various access technologies are used and plural clients 100 are present. Preferably, convergence may allow comprehensively unified resource management of a heterogeneous network that fuses various access technologies such as GSM, WCDMA, LTE, Wi-Fi, etc., thereby providing access networks of the clients 100 with diverse options, so that the clients 100 can select one or more access networks from the diverse networks provided by the heterogeneous network, and can switch from one network to another network, so that data can be parallelly transmitted to the servers 400 using parallel access technologies in plural paths, thereby providing the clients 100 with aggregative bandwidth resources. Preferably, the existing multi-path transmission schemes, such as MPTCP, may take at least one of plural networks as its primary transmission path, while using the remaining paths as spare transmission paths. For ensuring transmission continuity, when the clients 100 are moving and the networks are varying dynamically, data transmission is switched between the primary path and one of the spare paths. Alternatively, the data streams of the clients 100 may be distributed to plural communication paths 500, thereby improving usage of the communication paths, achieving load balance, and maximize aggregated bandwidth. Moreover, plural end-to-end connections may be implemented to enhance reliability. However, most existing multi-path transmission scheduling schemes adopt the simple round robin (RR) algorithm. Thereby, when a transmitting end transmits packets, the packets are distributed to different paths for transmission successively. The RR algorithm is the simplest and most straightforward algorithm for scheduling management. It can prevent the paths from being starved. However, due to network performance differences in terms of bandwidth, time delay, packet loss rate of paths, the RR algorithm may lead to out-of-order delivery of packets at the receiving end. Since these packets thus need to be reordered at the receiving end, cache resources and processor resources at the receiving end, which are always scant to most mobile clients 100, are unavoidable and undesirably consumed. In the traditional single-path transmission mode, out-of-order delivery of packets at the receiving end is usually a result of packet loss and path variation, and the solution is to simply discard the out-of-order packets or cache the out-of-order packets, and make retransmission for them timely, so as to reduce cache occupancy and reordering overheads. However, the foregoing solution is obviously not suitable for multi-path transmission. This is because when packets come from different paths and lose their order due to differences of the paths in terms of bandwidth and time delay, the packets thought lost or their confirmation may be actually on their way to the receiving end. If the out-of-order packets are discarded or retransmitted immediately to reduce the congestion window, the resulting transmission performance can be damaged. Alternatively, in the prior art, explicit congestion notification may be used to differentiate congestion from packet loss, and forward error correction may be used to correct errors. Also, the packet dynamic matching algorithm may be used for path selection of every packet. In fact, while most known scheduling schemes realize packet scheduling based on the combination of throughput and fairness, they fail to pay attention to maintaining and even improving user QoE. In particular, they all fail to consider how to optimize aggregative user QoE in applications with high traffic. Besides, most existing multi-path transmission methods or apparatuses are designed to implement end-to-end multi-path transmission at the transmission layer, making them dependent on kernel modification. Support from both the client 100 and the server 400 is required. Thus, they are not compatible with middleware large-scale deployed in existing networks.

In view of the foregoing shortcomings of the prior art, the present invention provides a relay device based on multi-path scheduling. The relay device can establish a complete multi-user multi-path transmission framework in a user space, and lift the packet scheduling logic to the application layer. Thereby, the communication/relay device is compatible with the existing network middleware without the need of modifying the kernel or the application. In addition, since the relay device of the present embodiment provide has its system designed to be in the user space layer, it is highly scalable, and can integrate new packet scheduling strategies, so as to facilitate optimization of deployment and performance.

Preferably, as shown in FIG. 1, the relay device at least comprises: at least one communication-receiving module 201, for receiving user data of the plural clients 100; at least one hardware interface module 202, for accessing a network that provides at least two mutually independent communication paths 500, so as to distribute the user data through the at least two communication paths 500; and at least one data-processing module 203, for mapping the received user data to a respective interface 501 of each of the at least two mutually independent communication paths 500. Preferably, the communication-receiving module 201 may be gateways, signal receivers, or signal receiving circuits, which can receive data in various formats and analyze the received data. Preferably, the hardware interface module 202 may be a baseband module with a SIM card interface corresponding to different operators, or may be a Wi-Fi module, a Bluetooth module, a Zigbee module, etc. Preferably, the data-processing module 203 at least includes a processor and a memory, wherein the memory is used to store instructions, and the processor is configured to execute instructions stored by the memory. The processor can be central processing unit (CPU), general-purpose processor, digital signal processor (DSP), application-specific integrated circuit (ASIC), field programmable gate array (FPGA) or other programmable logic devices, transistor logic devices, hardware components or any combination thereof. Preferably, the data-processing module 203 carries an operating system thereon, such as a Linux system. Preferably, the heterogeneous network can be accessed through the hardware interface module 202. A heterogeneous network includes multiple radio access networks, which may use different communication paths for transmission. However, same radio access technology can also be used in different communication paths for communication. For example, the frequency bands used by China Mobile's TD-LTE are 1880-1890 MHz, 2320-2370 MHz and 2575-12635 MHz. The frequency bands used by China Unicom's TD-LTE are 2300-2320 MHz and 2555-2575 MHz. The frequency bands used by China Unicom's FDD-LTE are 1755-1765 MHz for uplink frequency band and 1850-1860 MHz for downlink frequency band. The frequency bands used by China Telecom's TD-LTE are 2370-2390 MHz and 2635-2665 MHz. The frequency band used by China Telecom's FDD-LTE is 1765-1780 MHz for uplink frequency band.

Preferably, the data-processing module 203 distributes the user data received through the communication-receiving module 201 to a first processing path 210 and a second processing path 220 according to a specific type of target data. Preferably, the target data refers to data defined by the user. The user may edit the specific type of the target data according to practical needs. Preferably, the specific type of the target data is about whether the frame structure of the target data and the source address of the data belongs to a client 100 or server 400 directly served by the relay device. Preferably, the data-processing module 203 classifies data received by the communication-receiving module 201 according to the specific type of the target data. The data of the specific type of the target data are distributed to the first processing path 210, where the data are processed according to a predetermined manner. The predetermined manner may be any processing manner other than multi-path transmission, such as forwarding control data for settlement, or forwarding other information. Preferably, the first processing path 210 may send the data to user space or kernel protocol stack. Preferably, the second processing path 220 and the first processing path 210 are mutually independent. The second processing path 220 directly transmits data of the specific type of the target data to the data-processing module 203 while bypassing the kernel. The second processing path 220 may transmit the data to a user space of an operating system carried by the data-processing module 203. Bypassing the kernel protocol stack refers to that the data pass through the original socket instead of the standard socket. The original socket may transmit and receive the data packets not passing through the kernel protocol stack, so that the second processing path 220 can directly enter the user space without passing through the kernel protocol stack. Preferably, the data-processing module 203, by means of multi-stage continuous scheduling, drives the user data in the second processing path 220 to be transmitted in at least two mutually independent communication paths 500 provided by at least one hardware interface module 202, thereby achieving multi-path transmission between a plurality of clients 100 and a plurality of servers 400. Preferably, the data-processing module 203 distributes the user data in the second processing path 220 by means of multi-stage continuous scheduling. Preferably, the data in the second processing path 220 are distributed to interfaces 501 of the at least two mutually independent communication paths 500, respectively. With this configuration, the present invention uses the original socket through the second processing path 220 thereby processing the data streams transmitted by the clients 100 or the servers 400 in the user space, so as to realize kernel bypassing. As a result, data of a plurality of clients 100 can be transmitted at the user space level. The resulting multi-path transmission is designed to be completely in the user space, without the need of modifying the kernel of the system, and without involving alteration of the application. Also, this lifts the logic of multi-path packet scheduling to be applied to the user space of the application, thereby combining dynamic variation of the network and the regulations of the application from a global perspective to schedule packets and in turn optimizing aggregative QoE. Additionally, realizing both multi-path transmission and packet scheduling in the user space not only facilitates integrating and driving context data related to network performance, but also providing high scalability for integrating new packet scheduling strategies, thereby being contributive to optimization of deployment and performance.

Preferably, the data-processing module 203 transmits and schedules user data in the second processing path 220 in a separate network namespace. This configuration helps prevent conflict with kernel configurations of other programs, and mitigate potential security concerns. For example, for operations on the proxy server provided in the present embodiment for which reverse path filtering has to be banned, by letting a virtual Ethernet equipment that forwards data packets to a physical network interface card receive a data packet of any source IP generated by the relay device of the present embodiment, security risk incurred thereby will be separated from normally running programs, and is managed by the data-processing module 203 in its own network namespace.

Preferably, the relay device of the present embodiment is deployed as shown in FIG. 1. The client 100 may be connected to the communication-receiving module 201 in a wireless or wired manner. For example, the client may be connected to the communication-receiving module 201 in the relay device of the present invention through wireless access points (APs). The relay device of the present embodiment can access various networks of different access technologies through at least one hardware interface module 202. For example, it can access different core networks through a base station (such as BTS, NodeB, eNodeB, etc.), and access a short-wave communication network, GPS, a satellite communication network, a cellular mobile network, PSTN, ISDN, the Internet, etc. through a core network. At the server 400 side, if the server 400 supports multi-path transmission, such as by being installed with an application supporting multi-path transmission, the relay device provided in the present embodiment can directly establish a multi-path data link with the server 400. Where the server 400 does not support multi-path transmission, the multi-path data link may be established through the remote server 401 capable of the multi-path transmission that has a communication session with the server 400. Preferably, a device having the same function as the data-processing module 203 disclosed in this embodiment can also be used, wherein the device can communicate with the server 400 and thus can establish a multi-path data link with the relay device provided in this embodiment. Preferably, where the client 100 is capable of multi-path communication, the relay device provided in the present embodiment may be deployed at the server 400 side, which also means it can establish a session with the server 400. Thereby, the client 100 can establish a multi-path data link with the relay device provided in the present embodiment. With the deployment describe above, multi-path transmission between the client 100 and the server 400 can be established even if any one or both of the client 100 and the server 400 do not support multi-path transmission.

Preferably, the relay device of the present embodiment may provide different functions depending in where it is deployed. For example, in subways, trains, or multiple units moving at high speed, due to limitation caused by rapid movement and complex terrain, the mobile networks of passengers can be frequently interrupted. Thus, the relay device of the present embodiment may be deployed in these vehicles, and allow the user equipment of the passengers to access through APs, thereby using mobile networks of different frequency bands provided by different operators and remote server 401 deployed at the server 400, or server 400 having the function of multi-path transmission to establish connection, so as to realize multi-path transmission. For example, in public places having busy human traffic, like train stations and airports, the relay device of the present embodiment may be connected to equipment providing users with network services, so as to provide the network access function based on multi-path transmission for numerous users. Preferably, if a device having the same function as the data-processing module 203 disclosed in this embodiment or a remote server 401 capable of multi-path transmission is deployed in the backbone network of a content delivery network (CDN) provider, the multi-path transmission technology may be sued to make user access the CDN more efficiently. Alternatively, the remote server 401 or the device having the same function as the data-processing module 203 disclosed in this embodiment may be deployed in a specific local area network, so as to obtain the effect similar to a virtual private network VPN, which means the data in the local area network can be access from outside, and gain in transmission efficiency provided by multi-path transmission can be achieved. Preferably, in a real deployment, the relay device of the present embodiment can, besides at the user side of a base station (such as BTS, NodeB, eNodeB), also be deployed on the 3G core network elements SGSN (Serving GPRS Support Node) and GGSN (Gateway GPRS Support Node). Preferably, it can also be deployed in the 4G core network, for example the network elements of all-IP packet core network EPC (Evolved Packet Core) of the LTE (Long Term Evolution), such as SGW (Serving Gateway) and PGW (PDN Gateway). Preferably, it may also be deployed at user plane function in the 5G core network. Preferably, it may also be deployed on customer premise equipment (CPE).

Preferably, as shown in FIG. 1, plural mutually independent, available communication paths 500 exist between the relay device of the present embodiment and a remote server 401, or between the relay device of the present embodiment and an apparatus or a proxy that establishes sessions with a server 400 and is capable of multi-path transmission, or between the relay device of the present embodiment and a server 400 capable of multi-path transmission. Preferably, a communication path 500 may be referred to as a pipe. The pipes may be realized in various ways. For example, the pipe may be a TCP link. Preferably, the data-processing module 203 inversely multiplexes data in the second processing path 220 to plural interfaces 501, so that data in the second processing path 220 can be transmitted through the TCP sockets in the pipes. The payload and control data of the TCPs are packeted into the transmission layer. Preferably, a TCP BBR congestion control algorithm may be used to reduce end-to-end delay and packet loss. Preferably, inversely multiplexing refers to segmenting and packeting data streams coming from the second processing path 220 into messages at the data-processing module 203, and then distributing the messages to pipes. Every message has a header, which contains information of the connection ID, length and serial number of the application. Preferably, at the side of the server 400, a remote server 401 supporting multi-path transmission, or a proxy capable of multi-path transmission, or a server 400 capable multi-path transmission, extracts data and thereby recombines inversely multiplexed data streams, and then forwards them to the server 400 according to the connection ID. Preferably, the remote server 401, or the apparatus or proxy capable of multi-path transmission, or the server 400 capable of multi-path transmission, in the user space, transmits data fed back to the client 100 to the relay device of the present embodiment by means of inverse multiplexing. Use of the reverse multiplexing pipes that are TCP links helps eliminate overheads for establishing connections (such as, slow startup), so as to provide instant benefits to short streams and increase traffic in every pipe, thereby leading to better broadband usage.

Preferably, multi-stage continuous scheduling at least comprises a first stage, a second stage, and a third stage. The first stage is used to determine the order of connections with respect to users. This is about arranging the order according to which individual user connections are sent, so as to ensure fairness among all users and maintain QoE. The second stage is priority-based scheduling. In particular, transmission of emergency packets and retransmission across the communication paths 500 as described below with respect to the third stage are preferentially considered. The third stage is interface scheduling, which is about mapping the traffic of user connections to different interfaces 501 (corresponding to different communication paths 500) according to context-related information, so as to enhance end-to-end performance. Preferably, multi-stage continuous scheduling is done through that the data-processing module 203 drives streams (data streams) in the second processing path 220 to be mapped to different interfaces 501 by means of continuous coordinating and scheduling through the first stage, the second stage, and the third stage, successively. Preferably, to be mapped to different interfaces 501 means that the data streams are mapped to different communication paths 500. The term "continuous" as used with reference to multi-stage continuous scheduling indicates that scheduling is performed in the order of the first stage, the second stage, and the third stage. Coordinating may be made to mutual association among the first stage, the second stage, and the third stage as well as progression of the order of connections. Preferably, the first stage may be about determining the order of connections of plural clients 100 or servers 400. The second stage may be used to realize priority-based transmission. The third stage may be used to map the data streams of the order of connections as determined in the first stage and the second stage to at least one interface 501.

Preferably, the data-processing module 203 is configured to implement scheduling in the first stage as described below.

The user data in the second processing path 220 are classified into control streams that are always scheduled preferentially and are used to internally control information delivery, and user streams that correspond to individual clients 100. Preferably, the data-processing module 203 is configured to schedule user streams through: according to a user-designated grading policy, splitting user streams into at least two first groups having different first priority levels, and scheduling the connections with respect to the clients 100 in the at least two first groups according to a descending order of the first priority levels. Preferably, the grading policy designated by the user allows the user to split all user streams of connections with respect to the clients 100 into several first packets in a manner the user defines according to practical use scenes. Every first packet has its unique first priority level. For example, priority levels of user connections in terms of scheduling may be determined according to the order of sessions established by requests from clients 100, QoS of user service, user data packet services or other properties. With the foregoing configuration, the data-processing module 203, according to its custom division, divides connections of all clients 100 into different first packets. Every first packet has its unique first priority level. The data-processing module 203 always selects the user connection having the highest first priority level in the first packet as the first connection. When and only when the connections with a higher first priority level has no more data packet to transmit, the connections in the first packet having a lower first priority level will be selected.

Preferably, second priority levels of connections with respect to the client 100 in the first packet are assigned by means of completely fair scheduler. According to the descending order of the second priority level, the connections with respect to the client 100 in the first packet are scheduled. Preferably, in the first packet, there are plural connections with respect to clients 100. These connections have the same first priority level. The second priority levels are scheduling priority levels of individual connections of the first packet in the same first priority level. Preferably, the concept of the completely fair scheduler (CFS) is to assign every connection in the first packet with a certain amount of resource while maintaining fairness in terms of scheduled time. When some connection in the first packet has a relatively long runtime, its second priority level is decreased.

According to one preferred mode, the data-processing module 203 is configured to when new user streams join the connections with respect to the clients 100 in the first packets, assign all the new user streams of the connections of the clients 100 in the first packet with the highest second priority level, and implement scheduling in a circular manner. Preferably, for some applications, such as webpages, if the data of the previous first data threshold (e.g., 330 KB) can be acquired at the earliest possible time, it is likely that a half of the user requests are done, or QoE is satisfied to some extent. With this understanding, data streams that are relatively short should be assigned with relatively high priority levels. On the other hand, data streams that have been existing for log times should be biased so as to make them complete transmission as soon as possible. Therefore, a data stream newly appears in connections in the same first packet should be assigned with the highest second priority level. In other words, the new user stream will preempt the second priority level of the other data streams in the same first priority level that have not completed transmission after long times, so as to satisfy QoE as soon as possible. Preferably, scheduling in the circular manner refers to when the new user stream has a transmission time exceeding a first time threshold, or when the new user stream has a data volume exceeding a first data threshold, decreasing the second priority level of the new user stream to the lowest second priority level, and then dynamically increasing the second priority level of the user stream by means of completely fair scheduling until it reaches the highest second priority level. Preferably, the first time threshold or the first data threshold may be defined by the user according to application scenes. For example, for application scenes like high-speed rails, trains and train stations, most requests from the clients 100 is for webpage. Therefore, the first time threshold may be set as 3 seconds, and the first data threshold may be set as 330 KB. Preferably, a new user stream exceeding the first time threshold or the first data threshold is identified as a long stream, and will lose the right to preempting the higher second priority level. With the forgoing configuration, the user can further optimize QoE while satisfying fairness according to the needs of different application scenes in a progress-aware manner.

According to one preferred mode, when a client 100 in the first stage opens plural connections to connect resources in the same server 400 in the first stage, the data-processing module 203 packets the plural connections with respect to the client 100 directed to the resources in the same server 400 into a second packet. when at least one said user stream of the connection with respect to the client 100 in the second packet terminates its session, network resources acquired by the second packet are reallocated to the remaining user streams in the second packet that have not terminated their sessions, so as to shorten transmission time of the remaining user streams, thereby balancing overheads among the servers 400 having significant differences in data streams connected thereto. Preferably, since we did not take the size of every user stream as priori knowledge, it is impossible for use to allot network resources for transmission of every user stream in advance. Therefore, plural connections with respect to the clients 100 connected to the resources in the server 400 are packeted into the second packet. If a connection in the packet completes earlier than any other connections, the resources originally allocated to it will be reallocated to the other connections in the same packet, thereby speeding up the remaining connection. In other words, the QoE requirements of a single session are mapped to the network resource pool, thereby achieving balance and optimization. This configuration helps further enhance fairness among webpages. Two webpages, regardless of the numbers of their sub-stream, are allocated with the same amount of network resources. Meanwhile, through dynamic allocation, a stream having more bytes will be provided with more bandwidth. This allows pages to be downloaded with increased speed. Therefore, in the present invention, the priority level is multiplied by the number of connections related to the same page, so as to maintain user fairness while minimizing the time required for downloading the page.

According to one preferred mode, the data-processing module 203 is configured to implement scheduling in the third stage as described below.

User streams of corresponding clients 100 are mapped to at least one interface 501 provide by at least one hardware interface module 202 in the order of connections with respect to plural clients 100 as determined in the first stage and second stages. Preferably, based on a second data threshold, the user streams of every client 100 are divided into first data streams below the second data threshold and second data streams above the second data threshold. The first data streams are bound to one of plural interfaces 501, and the second data streams are mapped to the remaining interface 501. Preferably, based on the knowledge that for some applications, such as webpages, the first 330 KB of the user stream can satisfy a half of the user requests. By binding the first data streams and a particular interface 501, through the interface 501, all the first data streams will be mapped to the communication path 500 corresponding to that interface 501 for transmission. This helps reduce not only delay caused by out-of-order delivery, but also delay due to cross-path transmission through heterogeneous paths 500. In other words, while the first data streams are arranged to pass through the interface 501 having the relatively high RRT to transmit data packets, scheduling is performed to the communication paths 500 corresponding to the interface 501, so as to spare space in other paths that have relatively low RTTs, thereby potentially benefiting the other connections. Preferably, the second data threshold can be edited by the user. The second data threshold may be selected according to the current application environment.

According to one preferred mode, the data-processing module 203 is configured to map the second data streams to the remaining interface 501 through: unifying first scheduling behavior about multi-path transmission based on the remaining interfaces 501 and second scheduling behavior about cross-path retransmission, and assigning the optimal interface 501 to each data packet in the second data streams so as to provide the best service quality. Preferably, the second data streams may be transmitted through plural communication paths 500 to benefit from multiplexing. Timely cross-path 500 retransmission helps achieve balance and reduce data packet loss and delay caused by out-of-order delivery. Preferably, in virtue of the first scheduling behavior that unifies transmission in multiple paths and the second scheduling behavior about cross-path retransmission, broadband usage can be significantly improved. Preferably, the data-processing module 203 unifies and abstract the first scheduling behavior and the second scheduling behavior into function representation. Preferably, a utility function $f=RTT^{-1}+\alpha \cdot BW$ may be used to represent quality of the interfaces 501. Therein, the RTT and the bandwidth BW may be current network performance parameters acquired by a program carried by the data-processing module 203. $\alpha$ is a factor of proportionality that normalizes RTT and BW to the same unit We use $L_i$ to represent the loss rate in the interface i, and use $\mathcal{L}=\Pi_{i \in S}L_i$ to represent the loss rate of data packets, where S is a select interface set. Thus, $$c_i = \left(\frac{\mathcal{L}}{L_i} - \mathcal{L}\right)$$

may represent the contribution rate for the packet loss rate of the interface i, while $u_i=(1-L_i)f_i$ is the expected value of interface utilities. For distributing streams among the paths, we use $\tilde{u}_i = u_i \cdot BW_i/buf_i$, where $buf_i$ is the total size of the data packets in the TCP buffer area. We further use F to quantify the importance of the no-loss requirement of a particular data packet, or the extra bandwidth costs the scheduling program is willing to pay. In addition, $v=(1-\mathcal{L})F$ is added to the target function. The target function is designed as:

$$\text{MAX } N_{iface}^{-1}\Sigma_{i=1}^{N}Q_i(\tilde{u}_i + \beta c_i + c_i) \tag{1}$$

$$\text{s.t } Q_i(Q_i-1)=0, \forall 1 \leq i \leq N \tag{2}$$

Preferably, Equation (1) is the target function for unifying the first scheduling behavior and the second scheduling behavior. Equation (2) is the constraint condition of the target function. For simplicity, we make 0/0=0. In the equations, $Q_i$ represents whether the interface i is selected. $N_{iface}^{-1}\Sigma_{i=1}^{N}Q_i$ represents the number of interfaces 501 assigned to the second data streams. $\beta$ is the factor of proportionality. Equation (1) and Equation (2) express that if F is 0, only the interface having the greatest $\tilde{u}_i$ is selected.

If the order of magnitude of $\mathcal{L}$ F is equal to or greater than that of $u_i$, the data-processing module 203 selects plural interfaces 501. Therefore, we set F as 0 for transmission of normal second data streams, and set F as a greater value for transmission of data packets to be retransmitted.

According to one preferred mode, the data-processing module 203 is configured to implement scheduling in the second stage through: in response to the second scheduling behavior about the data packets to be retransmitted in the third stage, preferentially transmitting the data packets to be retransmitted. Preferably, for retransmission across the paths 500, spare interfaces 501 are selected. Preferably, preferentially scheduling data packets to be retransmitted across the paths 500 helps return to delivery of the data streams in the normal order, thereby mitigating out-of-order delivery delay, and packet loss.

Embodiment 2

The present embodiment discloses a relay method based on multi-path scheduling, the method including: deploying a first multi-path data-processing module 200 and a second multi-path data-processing module 300 in a routing path for communication between a plurality of clients 100 and a plurality of servers 400. The first multi-path data-processing module communicates with the clients 100 and converges plural access networks, and the second multi-path data-processing module communicates with the servers 400. Preferably, the radio access networks include wireless wide area network (WWAN), wireless metropolitan area network (WMAN), wireless local area network (WLAN), wireless personal area network (WPAN), mobile ad hoc network (MANET), mobile communication networks (such as 3G, 4G, 5G), satellite networks, wireless sensing networks or other heterogeneous networks. Preferably, the mobile communication network can be any mobile communication networks of various mobile communication technologies used by different operators. Preferably, converging refers to constructing a complete, multi-user, multi-path transmission framework in a heterogeneous network environment where various access technologies are used and plural clients 100 are present. Preferably, convergence may allow comprehensively unified resource management of a heterogeneous network that fuses various access technologies such as GSM, WCDMA, LTE, Wi-Fi, etc., thereby providing access networks of the clients 100 with diverse options, so that the clients 100 can select one or more access networks from the diverse networks provided by the heterogeneous network, and can switch from one network to another network, so that data can be parallelly transmitted to the servers 400 using parallel access technologies in plural paths, thereby providing the clients 100 with aggregative bandwidth resources.

Preferably, the first multi-path data-processing module 200 distributes data it receives to a first processing path 210 and a second processing path 220 wherein the first processing path 210 processes the data in a predetermined manner, and the second processing path is independent of the first processing while bypassing the kernel protocol stack. Preferably, the target data are data defined by the user. The user may edit the specific type of the target data according to practical needs. Preferably, the specific type of the target data refers to whether the frame structure of the target data and the source address of the data belongs to a client 100 directly served by the relay device. Preferably, the first multi-path data-processing module 200 classifies received data according to the specific type of the target data. The data of the specific type of the target data are distributed to the first processing path 210, where the data are processed according to a predetermined manner. The predetermined manner may be any processing manner other than multi-path transmission, such as forwarding control data for settlement, or forwarding other information. Preferably, the first processing path 210 may send the data to user space or kernel protocol stack. Preferably, the second processing path 220 and the first processing path 210 are mutually independent. The second processing path 220 directly transmits data of the specific type of the target data to the first multi-path data-processing module 200 while bypassing the kernel. Bypassing the kernel protocol stack refers to that the data pass through the original socket instead of the standard socket. The original socket may transmit and receive the data packets not passing through the kernel protocol stack, so that the second processing path 220 can directly enter the user space without passing through the kernel protocol stack.

Preferably, the first multi-path data-processing module 200 in the user space maps the data of the second processing path 220 to plural mutually independent communication paths 500 and communicates with the second multi-path data-processing module 300 by means of inverse multiplexing, thereby realizing multi-path transmission between plural clients 100 and plural servers 400. Preferably, the first multi-path data-processing module 220 may access plural different types of networks through the hardware interface module 202, thereby distributing the user data to plural mutually independent communication paths 500 corresponding to the different types of networks. With this configuration, the present invention uses the original socket through the second processing path 220 thereby processing the data streams transmitted by the clients 100 or the servers 400 in the user space, so as to realize kernel bypassing. As a result, data of a plurality of clients 100 can be transmitted at the user space level. The resulting multi-path transmission is designed to be completely in the user space, without the need of modifying the kernel of the system, and without involving alteration of the application. Also, this lifts the logic of multi-path packet scheduling to be applied to the user space of the application, thereby combining dynamic variation of the network and the regulations of the application from a global perspective to schedule packets and in turn optimizing aggregative QoE.

Preferably, the first multi-path data-processing module 200 and the second multi-path data-processing module 300 provided in the present embodiment may be deployed as shown in FIG. 2. A plurality of clients 100 may be connected to the first multi-path data-processing module 200 in a wireless or wired manner. For example, that may be connected to the first multi-path data-processing module 200 through wireless access points (APs). The first multi-path data-processing module 200 may be integrated into user equipment of a client 100, or may alternatively be installed on a router, a repeater, or a CPE at the user side, or may alternatively be provided at the user side in the form of standalone hardware, thereby accessing different core networks through a base station (such as BTS, NodeB, eNodeB, etc.), and accessing a short wave communication network, GPS, a satellite communication network, a cellular mobile network, PSTN, ISDN, the Internet, etc. through a core network. At the server 400 side, if the server 400 supports multi-path transmission, such as by being installed with an application supporting multi-path transmission, the first multi-path data-processing module 200 provided in the present embodiment can directly establish a multi-path data link with the server 400. Where the server 400 does not support multi-path transmission, the multi-path data link may be established through the second multi-path data-processing module 300 that has a communication session with the server 400. Preferably, where the client 100 is capable of multi-path communication, the first multi-path data-processing module 200 or the second multi-path data-processing module 300 provided in the present embodiment may be deployed at the server 400 side. Thereby, the client 100 can establish a multi-path data link with the first multi-path data-processing module 200 or the second multi-path data-processing module 300. With the deployment describe above, multi-path transmission between the client 100 and the server 400 can be established even if any one or both of the client 100 and the server 400 do not support multi-path transmission.

Preferably, in a real deployment, the first multi-path data-processing module 200 of the present embodiment can be deployed at the user side of a base station (such as BTS, NodeB, eNodeB). Preferably, the first multi-path data-processing module 200 and the second multi-path data-processing module 300 also can be deployed on the 3G core network elements SGSN (Serving GPRS Support Node) and GGSN (Gateway GPRS Support Node). Preferably, it can also be deployed in the 4G core network, for example the network elements of all-IP packet core network EPC (Evolved Packet Core) of the LTE (Long Term Evolution), such as SGW (Serving Gateway) and PGW (PDN Gateway). Preferably, it may also be deployed at user plane function in the 5G core network. Preferably, it may also be deployed on customer premise equipment (CPE).

Preferably, the first multi-path data-processing module 200 and the second multi-path data-processing module 300 can combine with virtual network devices. For example, the application calls a socket, so as to send corresponding data packet to the server 400. Through network address translation (NAT), a VPN service system forwards all the data packets to the virtual network device. The second multi-path data-processing module 300 reads the data from the virtual network device and acquires all the data packet forwarded to the virtual network device, so that the data in the local area network can be access from outside, and gain in transmission efficiency provided by multi-path transmission can be achieved.

Preferably, as shown in FIG. 2, there are plural mutually independent available communication paths 500 between the first multi-path data-processing module 200 and the second multi-path data-processing module 300. Preferably, a communication path 500 may also be referred to as a pipe. A pipe may be realized in various ways flexibly. For example, a TCP link may be used as a pipe. Preferably, data in the second processing path 220 may be inversely multiplexed to plural interfaces 501, so as to be transmitted through the TCP socket in each pipe. The payload and control data of TPC are packaged in the transmission layer. Preferably, the TCP BBR congestion control algorithm may be used to reduce end-to-end delay and packet loss. Preferably, inverse multiplexing refers to segmenting and packing the data stream coming from the second processing path 220 into messages, and distributing these messages to pipes. Therein, every message has a header, which contains information of the ID, the length, and the serial number of the connected application. Preferably, at the server 400 side, the second multi-path data-processing module 300 uses the extracted data to recombine the inversely multiplexed data stream, and forwards it to the server 400 according to the connection ID. By using reversely multiplexing pipes and using TCP link as the pipes, overheads for establishing connections (such as slow startup) can be eliminated, thereby providing short streams with instant benefits and making traffic in every pipe denser, leading to better broadband usage.

According to one preferred mode, the first multi-path data-processing module 200 and/or the second multi-path data-processing module 300 drive data in the second processing path 220 in the way that the first stage, the second stage, and the third stage are performed successively. The first stage is for determining the order of connections of plural clients 100. The second stage is for implementing priority-based transmission. The third stage is for mapping the user streams to at least one communication path 500 in the order of connections as determined in first stage and the second stage. The first multi-path data-processing module 200 and/or the second multi-path data-processing module 300 drives the data in the second processing path 220 in the way of continuously coordinating and scheduling through the first stage, the second stage, and the third stage. Preferably, continuously scheduling involving the first stage, the second stage, and the third stage as implemented in the present embodiment is similar to what is described for Embodiment 1, and thus no repetition is made herein.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents.

What is claimed is:

1. A relay device based on multi-path scheduling, at least comprising
   a data-processing module (203),
   wherein the data-processing module (203) is configured to transmit data sent by at least one client (100)/server (400) in the following multi-stage scheduling manner:
   a first stage where an order of connections of a set of plural clients (100)/servers (400) is determined;
   a second stage where priority-based transmission is performed; and
   a third stage where a set of data streams having the order of connections determined in the first stage mapped to at least one communication path (500),
   wherein the data-processing module (203) is configured to implement the scheduling in the first stage through:
   classifying the user data in a second processing path (220) or the data transmitted by the clients (100)/servers (400) into control streams that are always scheduled preferentially and are used to internally control information delivery, and user streams that correspond to individual said clients (100)/servers (400); and
   according to a user-designated grading policy, splitting the plural user streams into at least two first groups separate user streams comprising at least two first packets having different first priority levels, and scheduling the connections with respect to the clients (100)/servers (400) in the at least two first groups packets according to a descending order of the first priority levels.

2. The relay device of claim 1,
   wherein the connections with respect to the clients (100)/servers (400) in the first groups packets are assigned with second priority levels by means of completely fair scheduler, and the individual connections with respect to the clients (100)/servers (400) in the first groups packets are scheduled according to a descending order of the second priority levels.

3. The relay device of claim 2,
   wherein when a new user stream joins the plural connections with respect to the clients (100)/servers (400) in the first groups packets during the scheduling in the first stage, the data-processing module (203) assigns a second priority level of the new user stream with a highest second priority level, and implements scheduling in a circular manner,
   wherein scheduling in the circular manner refers to when the new user stream has a transmission time exceeding a first time threshold, or when the new user stream or has a data volume exceeding a first data threshold, decreasing the second priority level of the new user stream to a lowest second priority level, and then dynamically increasing the second priority level of the user stream by means of completely fair scheduler until it reaches the highest second priority level.

4. The relay device of claim 1,
   wherein the data-processing module (203) is configured to implement the scheduling in the third stage through:
   according to the order of the connections with respect to the plural clients (100)/servers (400) determined in the first and second stages, sequentially mapping user streams corresponding to the clients (100)/servers (400) to at least one interface of a set of plural interfaces (501),
   wherein based on a second data threshold, the user streams of the individual clients (100)/servers (400) are classified into first data streams below the second data threshold and second data streams above the second data threshold,
   wherein the first data streams are bound to one of the set of plural interfaces (501), and the second data streams are mapped to a set of remaining interfaces of the set of plural interfaces (501).

5. The relay device of claim 4,
   wherein the data-processing module (203) is configured to map the second data streams to the remaining interfaces of the set of plural interfaces (501) through:
   unifying first scheduling behavior about multi-path transmission based on the remaining interfaces of the set of plural interfaces (501) and second scheduling behavior about cross-path retransmission, and assigning an optimal interface from the remaining interfaces of the set of plural interfaces to each data packet in the second data streams so as to provide the best quality of service.

6. The relay device of claim 5,
wherein the data-processing module (203) is configured to implement the scheduling in the second stage through:
in response to the second scheduling behavior about the data packets to be retransmitted in the third stage, preferentially transmitting the data packets to be retransmitted,
wherein each of the data packets to be retransmitted is mapped to an available said interface of the set of plural interfaces (501) other than an interface previously used for initial transmission of the data packet, so as to achieve cross-path retransmission.

* * * * *